United States Patent
Kumagai et al.

(10) Patent No.: US 11,474,119 B2
(45) Date of Patent: Oct. 18, 2022

(54) AUTOMATIC ANALYSIS DEVICE

(71) Applicant: HITACHI HIGH-TECHNOLOGIES CORPORATION, Tokyo (JP)

(72) Inventors: Takahiro Kumagai, Tokyo (JP); Takenori Okusa, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 354 days.

(21) Appl. No.: 16/624,376

(22) PCT Filed: Mar. 30, 2018

(86) PCT No.: PCT/JP2018/013833
§ 371 (c)(1),
(2) Date: Dec. 19, 2019

(87) PCT Pub. No.: WO2019/017015
PCT Pub. Date: Jan. 24, 2019

(65) Prior Publication Data
US 2020/0217863 A1    Jul. 9, 2020

(30) Foreign Application Priority Data
Jul. 21, 2017   (JP) .............................. JP2017-141446

(51) Int. Cl.
*G01N 35/00*   (2006.01)
*G01N 35/04*   (2006.01)

(52) U.S. Cl.
CPC ....... *G01N 35/00732* (2013.01); *G01N 35/04* (2013.01); *G01N 2035/00792* (2013.01); *G01N 2035/0443* (2013.01)

(58) Field of Classification Search
CPC ............. G01N 35/00732; G01N 35/04; G01N 2035/0443; G01N 2035/0434;
(Continued)

(56) References Cited

U.S. PATENT DOCUMENTS

2005/0178795 A1    8/2005   Inoue
2009/0305392 A1*  12/2009   Alfredsson ............ G16H 10/40
                                                        435/286.1
(Continued)

FOREIGN PATENT DOCUMENTS

JP          07-234228 A    9/1995
JP          10-94762 A     4/1998
(Continued)

OTHER PUBLICATIONS

Japanese Office Action received in corresponding Japanese Application No. 2019-530872 dated Sep. 29, 2020.
(Continued)

*Primary Examiner* — Benjamin R Whatley
(74) *Attorney, Agent, or Firm* — Mattingly & Malur, PC

(57) ABSTRACT

There is provided an automatic analysis device that can appropriately sort and discard expendable items. The automatic analysis device includes a common transport mechanism that transports a plurality of types of expendable items by common mechanism, a plurality of transport paths that is provided separately from the common transport mechanism, a type determination portion that determines the type of expendable item being transported by the common transport mechanism. The automatic analysis device controls to select one of a plurality of transport paths according to a determination result of the type determination portion and to transport the expendable items transported from the common transport mechanism via the selected transport path.

3 Claims, 10 Drawing Sheets

(58) Field of Classification Search
CPC ... G01N 2035/103; G01N 2035/00792; G01N 2035/00801; G01N 2035/00811
See application file for complete search history.

(56) References Cited

U.S. PATENT DOCUMENTS

| | | |
|---|---|---|
| 2013/0044207 A1* | 2/2013 | Calcoen .................. G01N 21/89 348/91 |
| 2013/0065797 A1* | 3/2013 | Silbert ..................... G01N 1/31 73/304 C |
| 2014/0079591 A1 | 3/2014 | Toyoshima et al. |
| 2015/0093834 A1* | 4/2015 | Knecht .............. G01N 35/0099 422/63 |
| 2016/0154016 A1 | 6/2016 | Yamashita et al. |

FOREIGN PATENT DOCUMENTS

| | | |
|---|---|---|
| JP | 3506000 B2 | 3/2004 |
| JP | 2005-201769 A | 7/2005 |
| JP | 4726450 B2 | 7/2011 |
| JP | 5993679 B2 | 9/2016 |
| WO | 2015/019880 A1 | 2/2015 |

OTHER PUBLICATIONS

International Search Report of PCT/JP2018/013833 dated Jun. 26, 2018.

* cited by examiner

[Fig. 1]
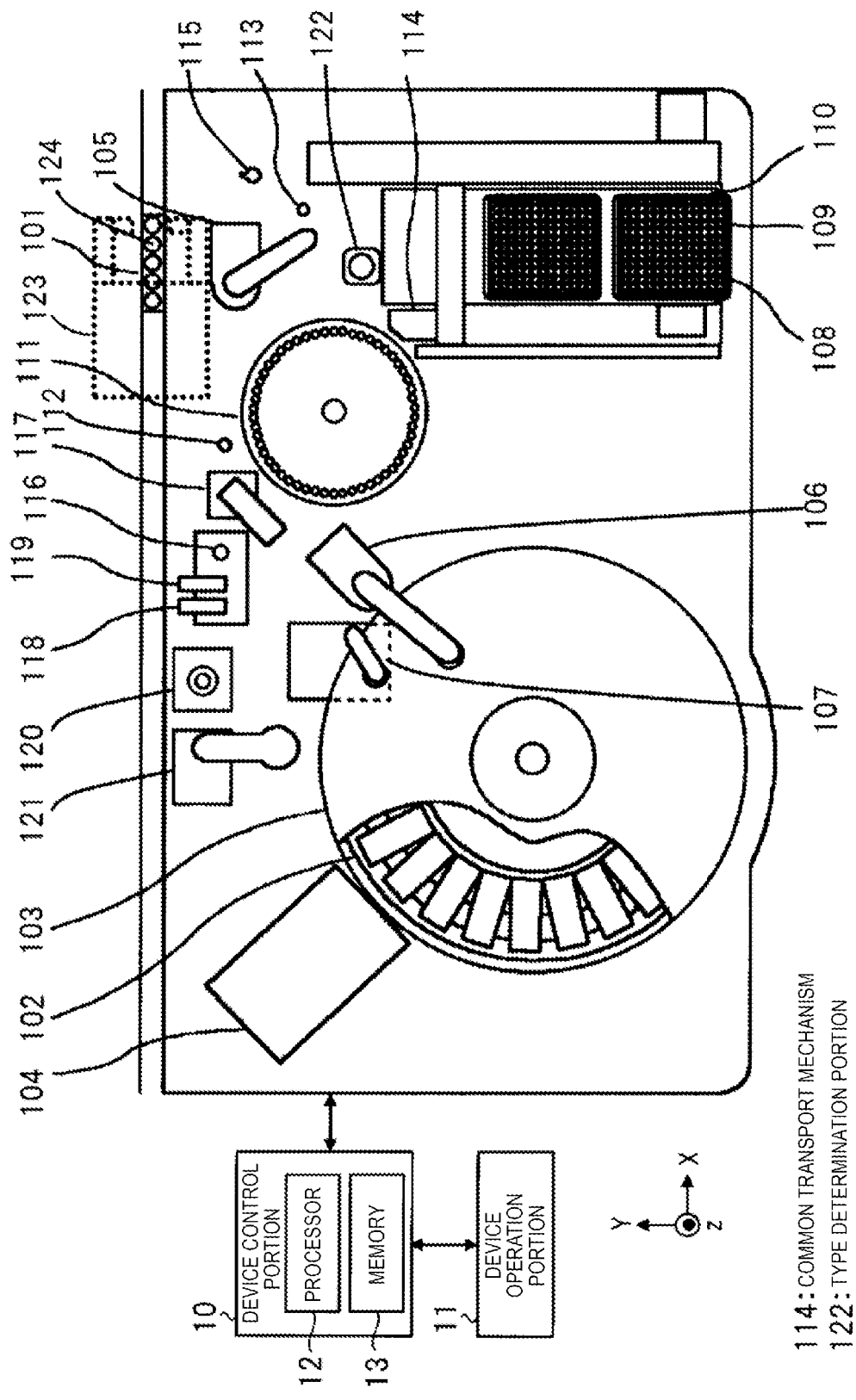
114: COMMON TRANSPORT MECHANISM
122: TYPE DETERMINATION PORTION

[Fig. 2A]
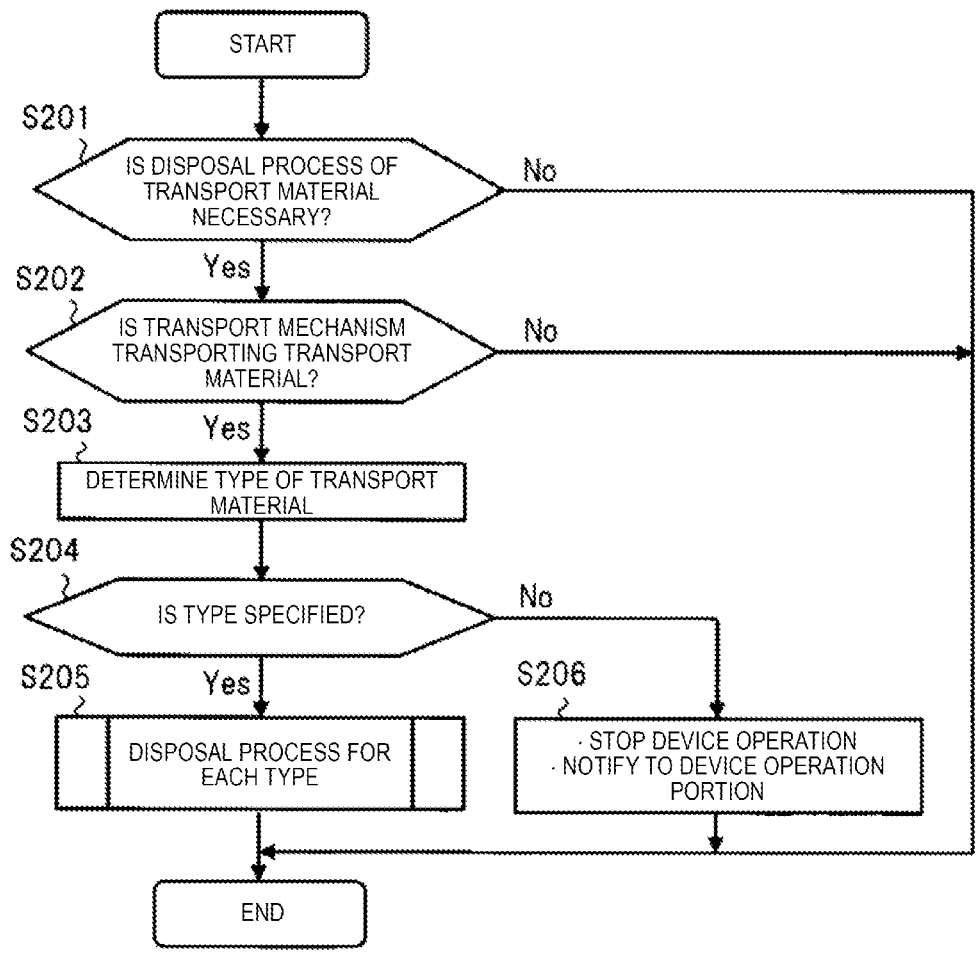

[Fig. 2B]
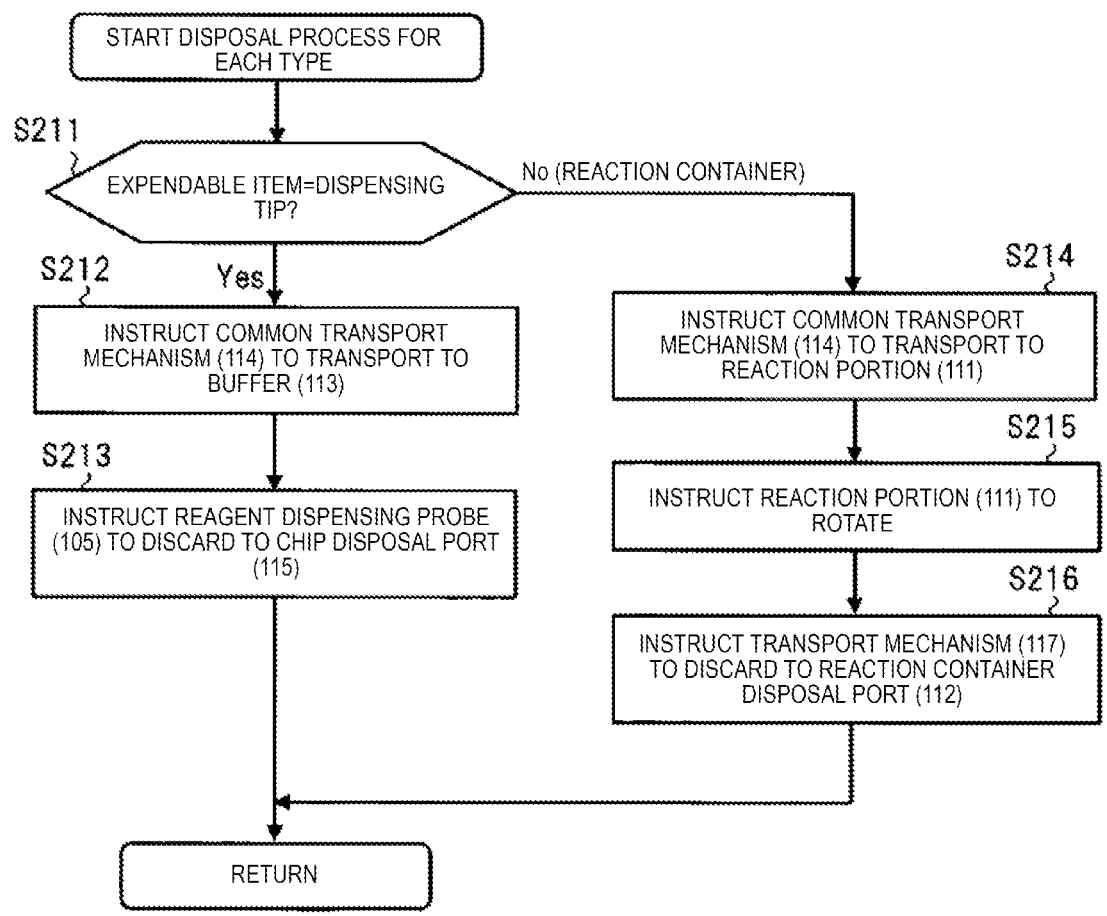

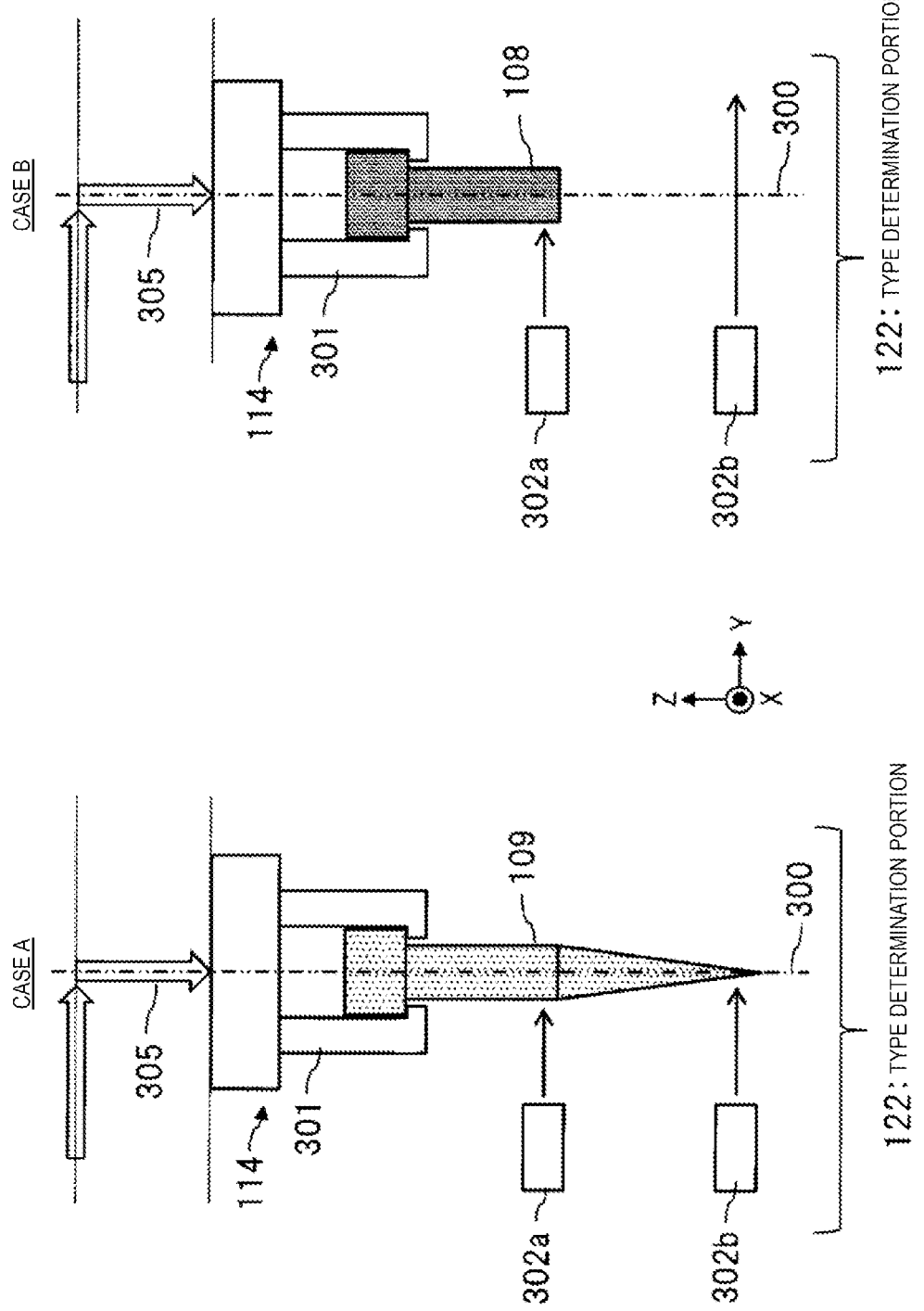

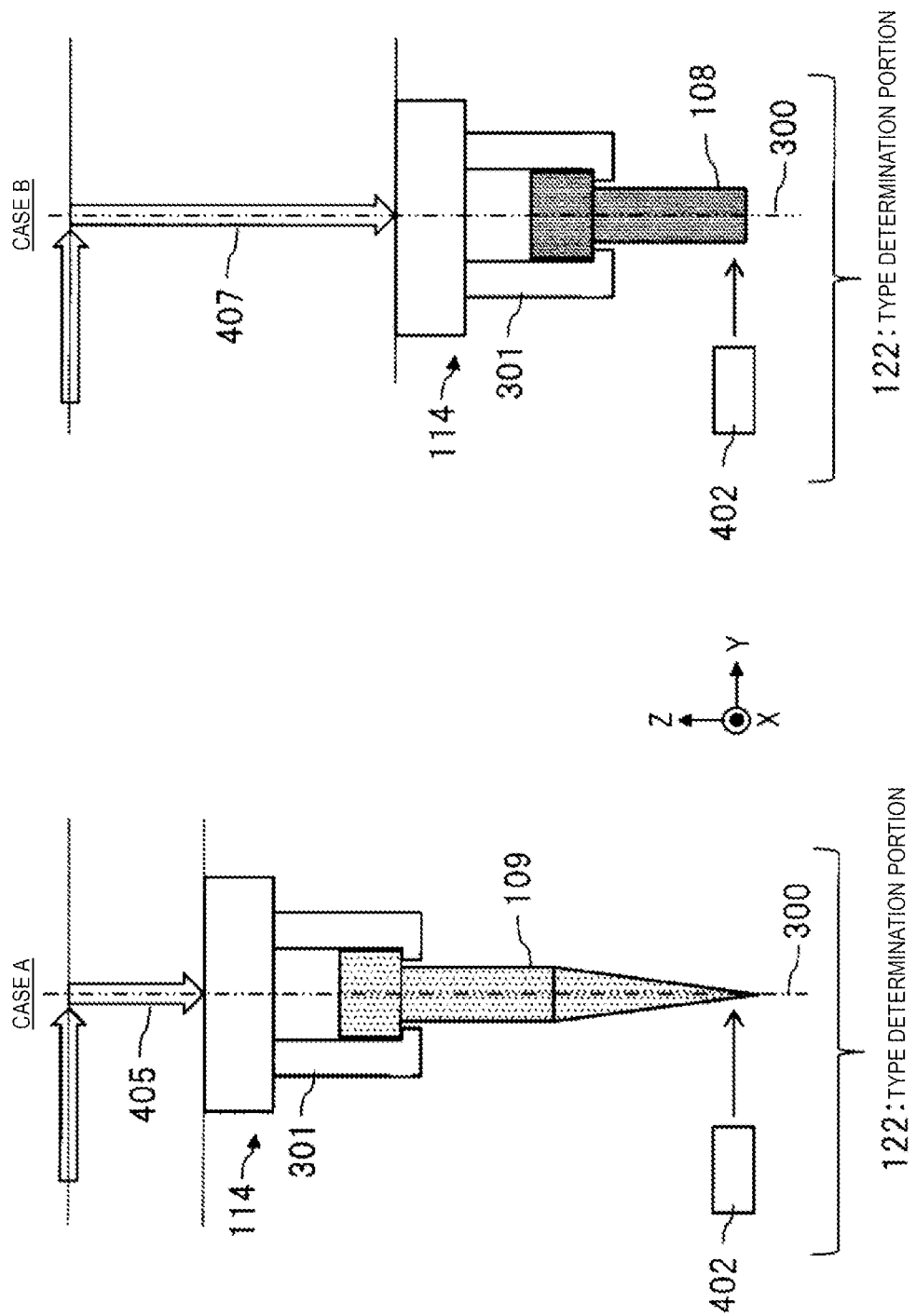

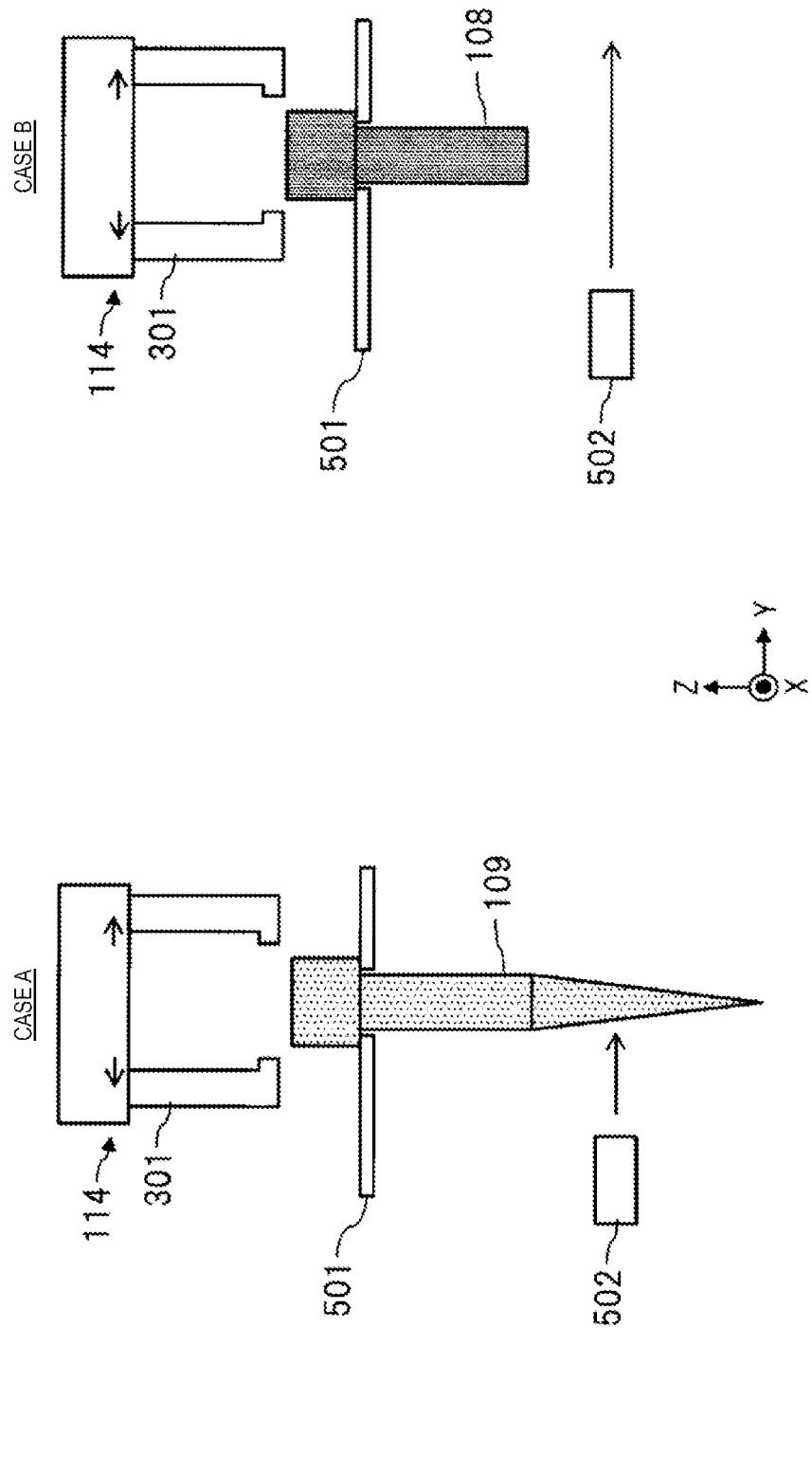

[Fig. 5B]
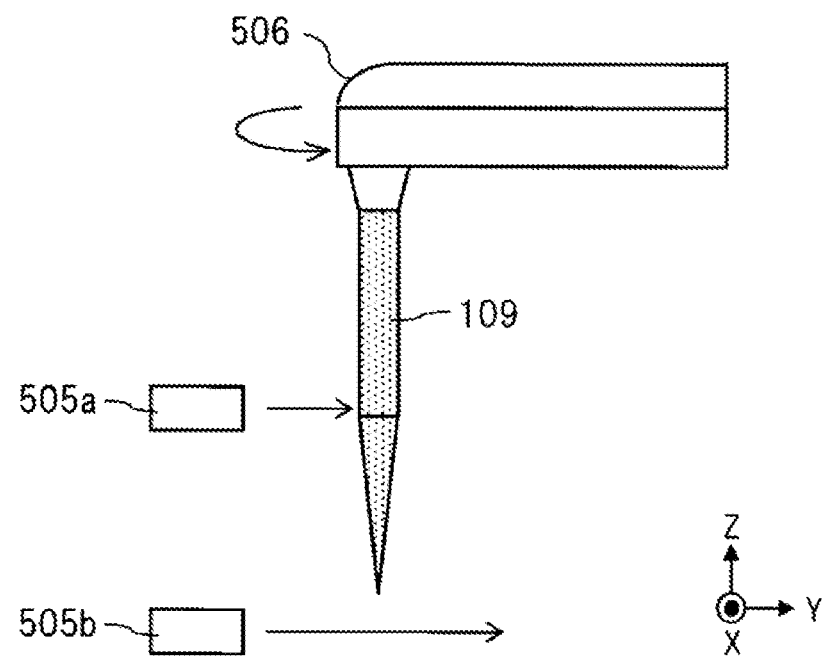

[Fig. 6]
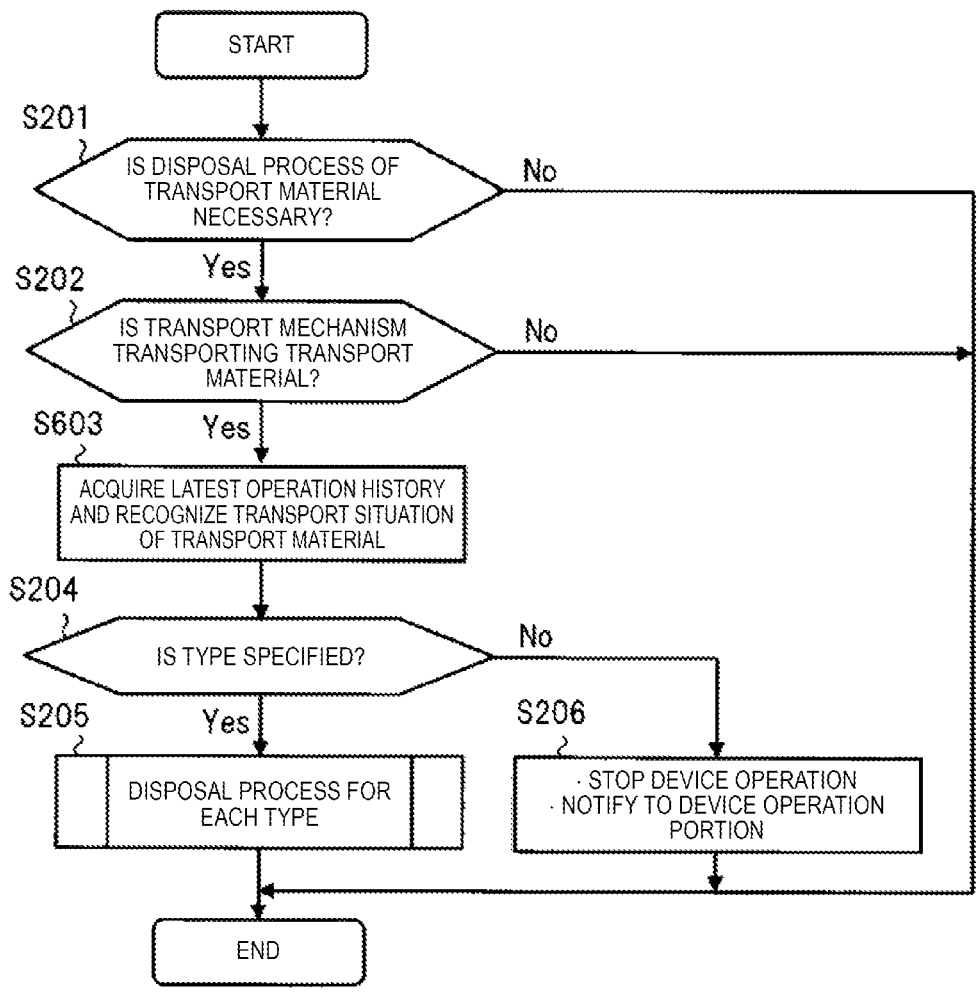

[Fig. 7]
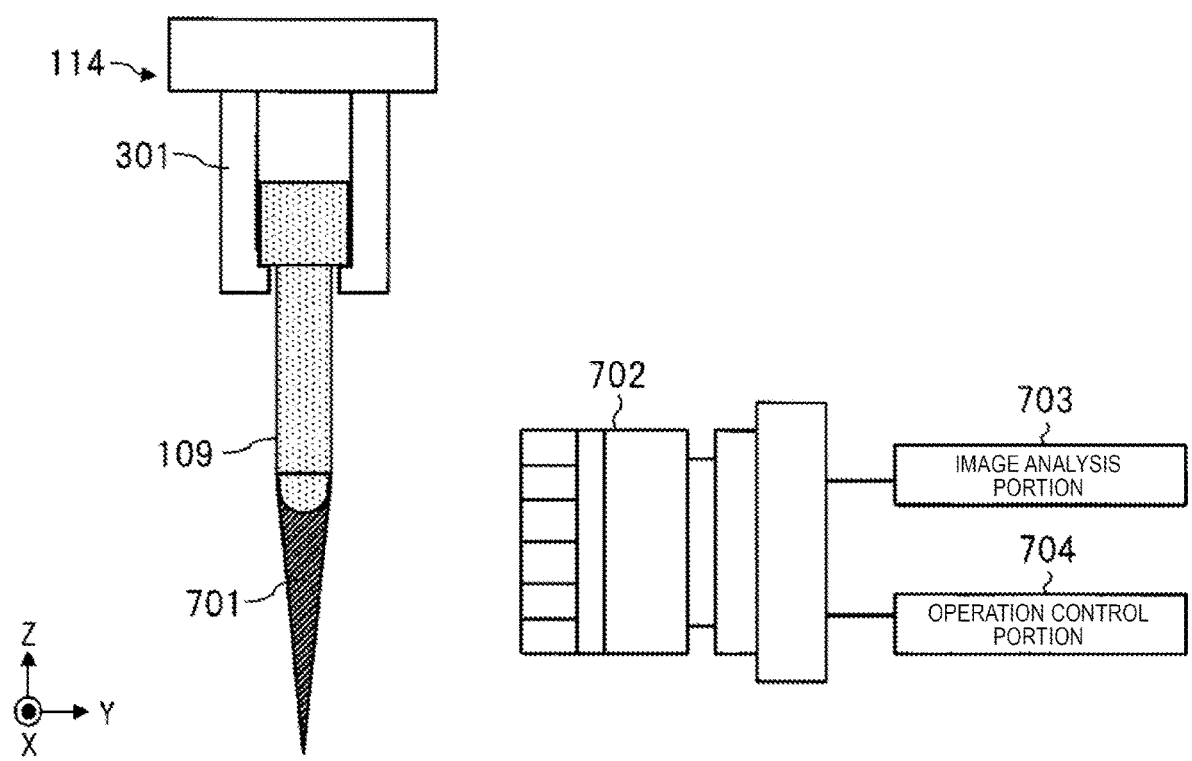

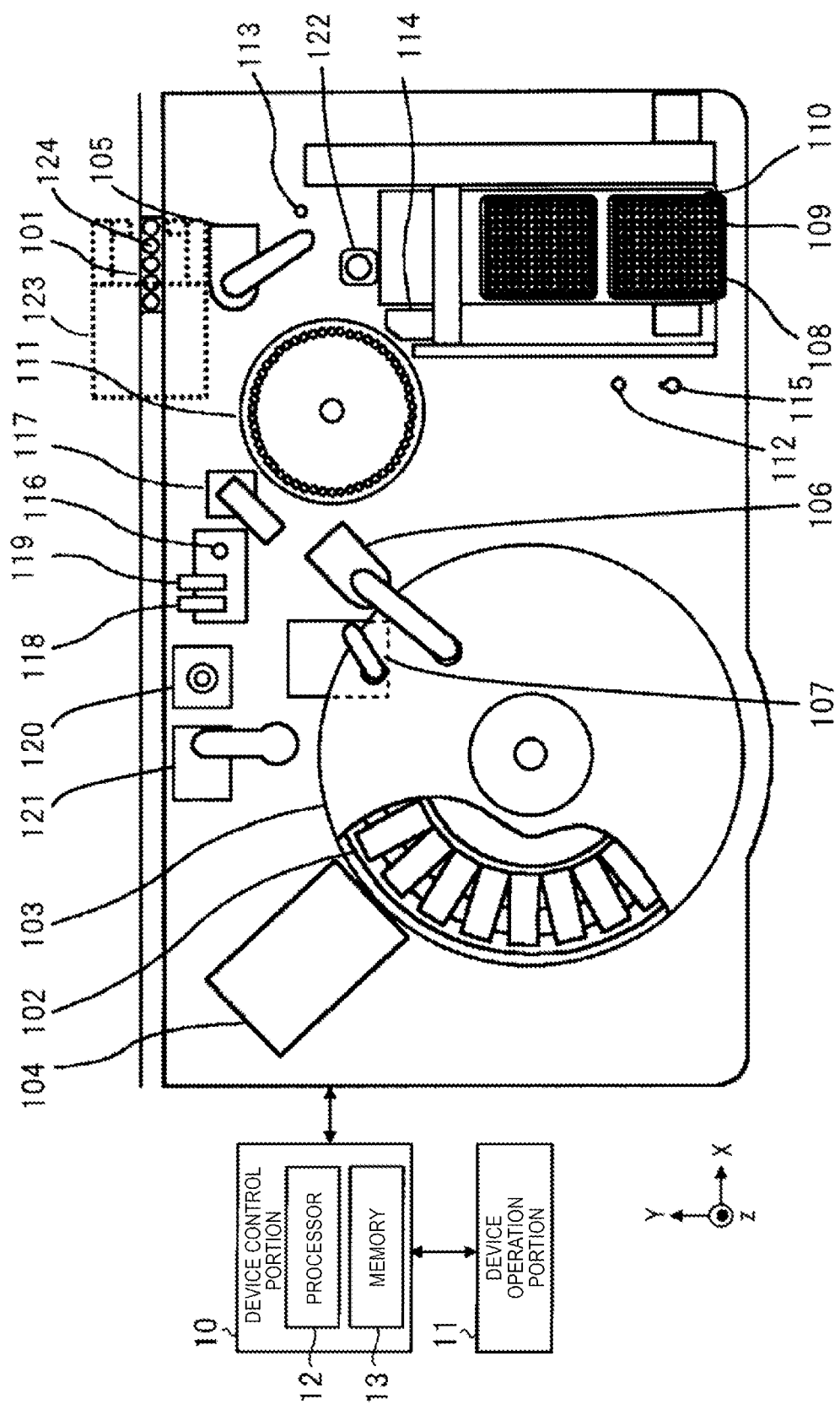
[Fig. 8]

AUTOMATIC ANALYSIS DEVICE

TECHNICAL FIELD

The present invention relates to an automatic analysis device, and to the automatic analysis device including a mechanism that transports a plurality of types of expendable items, for example.

BACKGROUND ART

Patent Literature 1 describes a technique that prevents inaccurate dispensing due to detachment after mounting a dispensing tip by monitoring whether the dispensing tip is appropriately mounted on a dispensing mechanism portion in the transfer period of the dispensing mechanism portion by a transfer portion.

CITATION LIST

Patent Literature

Patent Literature 1: Japanese Unexamined Patent Application Publication No. 2005-201769

SUMMARY OF INVENTION

Technical Problem

For example, in order to analyze a specific component included in a specimen, such as blood serum and urine, various automatic analysis devices including biochemical analysis devices and immunity analysis devices are used. In such an automatic analysis device, in order to prevent carry-over and to ensure analysis performance, a plurality of types of expendable items that are disposable containers are used. Thus, the automatic analysis device includes various transport mechanisms that appropriately transport a plurality of types of such expendable items and discard used expendable items. Various transport mechanisms sometimes include a mechanism that transports a plurality of types of expendable items in common.

On the other hand, a plurality of types of expendable items has different shapes, materials, uses, and the like. Thus, in discarding a plurality of types of expendable items, it is desirable to sort and discard the expendable items for each type. Specifically, in discarding expendable items that have handled a biological sample, for example, an additional process, for example, is sometimes necessary from the viewpoint of safety, and the importance of sorting and discarding expendable items is increasing. In such situations, the Patent Literature 1 does not have a viewpoint relating to the sorting and discarding of expendable items. For example, a plurality of types of expendable items is sometimes collected at one place.

The present invention is made in view of such circumstances, and one of objects of the present invention is to provide an automatic analysis device that can appropriately separately discard expendable items.

The object, other objects, and novel characteristics of the present invention will be apparent from the description of the present specification and the accompanying drawings.

Solution to Problem

In embodiments disclosed in the present application, the following is a brief description of the outline of representative ones.

An automatic analysis device according to an embodiment has a common transport mechanism that transports types of expendable items by a common mechanism, transport paths that are provided separately from the common transport mechanism, and a determination portion that determines a type of the expendable item being transported by the common transport mechanism. The automatic analysis device is controlled to select one of the transport paths according to a determination result of the determination portion and to transport the expendable item transported from the common transport mechanism via the selected transport path.

Advantageous Effects of Invention

In the inventions disclosed in the present application, in the brief description of the effect obtained from a representative embodiment, it is made possible to appropriately sort and discard expendable items in an automatic analysis device using types of expendable items.

BRIEF DESCRIPTION OF DRAWINGS

FIG. 1 is a schematic view illustrating a configuration example of a main portion of an automatic analysis device according to Embodiment 1 of the present invention.

FIG. 2A is a flowchart illustrating an example of processing contents of a portion of a device control portion in FIG. 1.

FIG. 2B is a flowchart illustrating an example of detailed processing contents of a discarding process for each type in FIG. 2A.

FIG. 3 is a schematic view illustrating a configuration example of a type determination portion in FIG. 1.

FIG. 4 is a schematic view illustrating a configuration example of the type determination portion in FIG. 1 in an automatic analysis device according to Embodiment 2 of the present invention.

FIG. 5A is a schematic view illustrating a configuration example of a type determination portion in an automatic analysis device according to Embodiment 3 of the present invention.

FIG. 5B is a schematic view illustrating a configuration example of a type determination portion in the automatic analysis device according to Embodiment 3 of the present invention.

FIG. 6 is a flowchart illustrating an example of processing contents of a portion of a device control portion in an automatic analysis device according to Embodiment 4 of the present invention.

FIG. 7 is a schematic view illustrating a configuration example of a type determination portion in an automatic analysis device according to Embodiment 5 of the present invention.

FIG. 8 is a schematic view illustrating a configuration example of a main portion of an automatic analysis device according to Embodiment 6 of the present invention.

DESCRIPTION OF EMBODIMENTS

In embodiments blow, when necessity arises for convenience, the description will be made in a plurality of sections or separate embodiments. However, these separate sections or embodiments are not irrelevant, and are in the relationship of a part of exemplary modifications between one and the other or exemplary modifications of all separate sections or embodiments, details, and supplementary explanations, for example, unless otherwise specified. In the embodiments below, in the case in which the number of elements, for example, (including numbers, numerical values, amounts, ranges, and the like) is mentioned, the limitation is imposed on the number, and the number may be a specific number or more or less, unless otherwise specified or except the case in which a specific number is clearly and theoretically limited.

In the following, in the embodiments below, it is without saying that the components of the embodiments (element steps, for example, are also included) are not necessarily essential, unless otherwise specified or except the case in which it is thought that the components are clearly and theoretically essential. Similarly, in the embodiments below, when the shapes and the positional relationship, for example, of the component are mentioned, shapes substantially approximate and similar to the shapes, for example, are included, unless otherwise specified or except the case in which it is thought that shapes are not clearly and theoretically similar. This is similarly applied to the numerical values and the ranges described above.

In the following, the embodiments of the present invention will be described in detail with reference to the drawings. Note that in all the drawings for explaining the embodiments, the same members are designated with the same reference signs in principle, and the duplicate description is omitted.

First Embodiment

Schematic Configuration and Schematic Operation of Automatic Analysis Device

FIG. 1 is a schematic view illustrating a configuration example of a main portion of an automatic analysis device according to a first embodiment of the present invention. The automatic analysis device illustrated in FIG. 1 is a biochemical analysis device or an immunity analysis device, for example, that analyzes specific components included in a specimen (a sample), such as blood serum and urine, for example. However, the automatic analysis device is not limited to these devices specifically. The automatic analysis device may be a mass spectrometer used for clinical examinations, or a clotting analysis device that measures the clotting time of blood, and any other device, for example. The automatic analysis device may be a composite appropriately combining a mass spectrometer, a clotting analysis device, a biochemical analysis device, an immunity analysis device, and any other device, or may be in a form of an automatic analysis system applying these devices.

The automatic analysis device illustrated in FIG. 1 (e.g. an immunity analysis device) includes a transport device that transports a sample rack 101 on which a sample is placed, a reagent disk 103, a storage box 110, a reaction portion 111 (a reaction disk), a magnetic separation mechanism including a magnetic separator 116, a detection portion 120, and various transport mechanisms that transport reagent containers or reaction containers to the portions of the device. The automatic analysis device includes a device control portion 10 that control the overall operation of the device and a device operation portion 11 serving as an interface between the device control portion 10 and an operator.

The device control portion 10 includes a processor 12 and a memory 13 including a RAM (Random Access Memory), ROM (Read Only Memory), and a HDD (Hard Disk Drive), for example, and controls the operation sequence of the overall device by processing programs by the processor 12. The device control portion 10 is not limited to the configuration using such program processing, and may have a configuration using dedicated hardware processing, or may have a configuration using an appropriate combination of program processing and hardware processing. The device operation portion 11 is configured of a display portion, such as a display, for example, and an input device, such as a mouse and a keyboard.

For example, the transport device places the sample rack 101 on a belt, and transports the sample rack 101 with the belt. The transport device may be a disk that places the sample on the disk and transports the sample by rotation, or may be a device that catches the sample rack 101 and transports the sample rack 101 by lifting operation. In the reagent disk 103, a reagent container 102 containing a reagent and magnetic particles necessary to immune reaction is housed. This reagent container 102 is attached with a cover. In the storage box 110, a reaction container 108 used for reaction and a sample dispensing tip 109 used for splitting and dispensing of a sample (in the following, referred to as a tip) are housed. The reaction container 108 and the tip 109 are expendable items used in analysis. On the reaction portion 111, the reaction container 108 is placed, and the reaction between the sample and the reagent is performed in the reaction container 108 that is placed. The reaction portion 111 has a temperature control mechanism necessary to the reaction between the sample and the reagent.

Various transport mechanisms include a common transport mechanism 114 and a transport mechanism 117. The common transport mechanism 114 transports a plurality of types of expendable items using a common mechanism. In this example, the common transport mechanism 114 transports the reaction container 108 to the reaction portion 111, and transports the tip 109 to a buffer 113. The buffer 113 is a temporary storage place for the tip 109 before used for dispensing. Specifically, for example, the common transport mechanism 114 includes a grip mechanism that grips the tip 109 or the reaction container 108 and a rail mechanism that moves the grip mechanism through rails provided in an X-axis, a Y-axis, and a Z-axis directions. The transport mechanism 117 appropriately transports the reaction container 108 among the reaction portion 111, the magnetic separator 116, the detection portion 120, and the reaction container discarding port 112.

The automatic analysis device includes a container lid opening and closing mechanism 104, a sample dispensing probe 105, a reagent dispensing probe 106, and a magnetic particle stirring mechanism 107. The sample dispensing probe 105 splits and dispenses a sample from the sample rack 101 with the tip 109 that is stored on the buffer 113 mounted. The container lid opening and closing mechanism 104 opens and closes the cover of the reagent container 102. The reagent dispensing probe 106 splits and dispenses a reagent and magnetic particles from the reagent container 102.

The magnetic separation mechanism includes the magnetic separator 116, an impurity suction mechanism 118, and a cleaning liquid discharge mechanism 119. The impurity suction mechanism 118 sucks a liquid including an impurity in the reaction container 108 that is transported to the magnetic separator 116. The cleaning liquid discharge mechanism 119 discharges a cleaning fluid to the inside of the reaction container 108 transported to the magnetic separator 116. Near the detection portion 120, a reagent discharge mechanism 121 is provided. The reagent discharge mechanism 121 discharges a detection reagent to the reaction container 108 transported to the detection portion 120.

Next, the operation of the automatic analysis device in FIG. 1 will be described. The operations of the portions are performed by receiving an instruction from the device control portion 10. First, the common transport mechanism 114 transports the reaction container 108 from the storage box 110 to the reaction portion 111. The common transport mechanism 114 transports the tip 109 to the buffer 113. The reaction portion 111 rotates and moves the transported reaction container 108 to a reagent dispensing position. The reagent dispensing probe 106 dispenses a reagent from the reagent disk 103 to the reaction container 108 on the reaction portion 111.

After that, the reaction portion 111 again rotates and moves the reaction container 108 to the sample dispensing position. The sample dispensing probe 105 includes a tip holding portion, and mounts the tip 109 transported to the buffer 113 on the tip holding portion b rotational motion and vertical operation. The sample dispensing probe 105 mounted on the tip 109 splits a sample from the sample container 124 placed on the sample rack 101, and dispenses the sample to the reaction container 108 moved at the sample dispensing position. In splitting, the sample container 124 is clamped by a container clamping device 123. The sample dispensing probe 105 moves the used tip 109 to a tip discarding port 115 by rotational motion and vertical operation, removes the tip 109, and discards the tip 109 to the tip discarding port 115.

On the other hand, the reaction portion 111 waits for a certain period of time with the reaction container 108 after the sample and the reagent are dispensed being placed, and then moves the reaction container 108 to the reagent dispensing position by rotation. The certain period of time is time necessary to the reaction between the sample and the reagent. The reagent dispensing probe 106 splits magnetic particles from the reagent disk 103, and dispenses the magnetic particles to the reaction container 108 that has to be at the reagent dispensing position. After waiting for a reaction for a certain period of time in the reaction portion 111, the reaction portion 111 rotates to a predetermined position, and the transport mechanism 117 transports the reaction container 108 on the reaction portion 111 to the magnetic separator 116.

The magnetic separator 116 separates a magnetic component including a reaction product in the reaction container 108 from a non-magnetic component including an impurity. Specifically, suction by the impurity suction mechanism 118 and discharging the cleaning fluid by the cleaning liquid discharge mechanism 119 are repeated for a several times, and finally, only the magnetic component including the reaction product remains in the reaction container 108. The transport mechanism 117 transports the reaction container 108 in which the magnetic component remains to the detection portion 120. After that, the reagent discharge mechanism 121 discharges a reagent for detection to the reaction container 108, and detection is performed. The transport mechanism 117 transports the reaction container 108 after detection to the reaction container discarding port 112, and after that, the automatic analysis device repeats the above-described operation to the subsequent samples as well.

In the configuration and the operation as described above, the automatic analysis device in FIG. 1 further includes a type determination portion 122. The type determination portion 122 determines a type of the expendable item being transported by the common transport mechanism 114 (in this example, the reaction container 108 or the tip 109). The automatic analysis device in FIG. 1 selects any of plurality of transport paths separately provided from the common transport mechanism 114 depending on the determined result of the type determination portion 122, and performs control such that the expendable item from the common transport mechanism 114 is transported through the selected transport path. Ahead of each of the plurality of transport paths, a plurality of discarding ports (in this example, the reaction container discarding port 112 and the tip discarding port 115) is provided. The automatic analysis device finally discards an expendable item through the plurality of transport paths. In this regard, in the following, the operation will be described more in detail.

First, the reaction container 108 is stored on the storage box 110, and transported with the reaction container 108 gripped by the common transport mechanism 114, and the type is determined at the type determination portion 122. The automatic analysis device selects a first transport path that is a path from the position at which the type is determined to the reaction container discarding port 112 depending on the determined result. In the first transport path, first, the reaction container 108 is placed on the reaction portion 111 by the common transport mechanism 114. Subsequently, the reaction container 108 is moved to the reagent dispensing position or the sample dispensing position by the rotation of the reaction portion 111, gripped by the transport mechanism 117 after the reagent, the sample, and the magnetic particles are dispensed, and placed on the magnetic separator 116. The reaction container 108 in which the magnetic component is separated by the magnetic separator 116 is transported to the detection portion 120 by the transport mechanism 117. After that, the reaction container 108 after detection is discarded to the reaction container discarding port 112 by the transport mechanism 117.

On the other hand, the tip 109 is stored on the storage box 110, transported with the tip 109 gripped by the common transport mechanism 114, and the type is determined at the type determination portion 122. The automatic analysis device selects a second transport path that is a path from the position at which the type is determined to the tip discarding port 115 depending on the determined result. In the second transport path, first, the tip 109 is placed on the buffer 113 by the common transport mechanism 114. Subsequently, the tip 109 is mounted on the sample dispensing probe 105 by the operation of the sample dispensing probe 105. After that, after the specimen is split and discharged, the tip 109 is removed from the sample dispensing probe 105 by the operation of the sample dispensing probe 105, and discarded to the tip discarding port 115.

The reaction container discarding port 112 is not connected to the tip discarding port 115 at a place not illustrated in the drawing, and the expendable item discarded to the reaction container discarding port 112 and the expendable item discarded to the tip discarding port 115 are separately collected. As a result, it is made possible to appropriately sort and discard expendable items.

Note that in this example, the operation range of the common transport mechanism 114 includes the region of the storage box 110 on which the reaction container 108 and the tip 109 are placed. However, for example, in the case in which the reaction container 108 and the tip 109 are transported in the combination of a plurality of mechanisms, the operation range may not include the storage box 110.

Detail of the Device Control Portion

Here, in actual operation, there are a regular case and an irregular case as the cases of discarding expendable items. The regular case means the case in which expendable items are used in various processes necessary to analysis and then discarded, like the above-described first transport path or the second transport path. In such a regular case, generally, the device control portion 10 sequentially manages the transport path of the expendable item based on a predetermined time sequence, and also recognizes in advance a type of the expendable item being transported by the common transport mechanism 114 based on a time sequence. Therefore, in such a case, the type determination portion 122 does not necessarily perform type determination.

On the other hand, for example, in the irregular case, a type of the expendable item being transported is sometimes unknown. The irregular case means the case in which a predetermined device error (in other words, an abnormality halt) occurs in the transportation of an expendable item by the common transport mechanism 114, for example, or the case in which analysis has to be interrupted in emergency due to various circumstances, and any other cases. In such an irregular case, from the viewpoint of safety, it is desired to temporarily discard the expendable item being transported. However, in the case in which a type of the expendable item being transported is unknown, it is difficult to appropriately sort and discard the expendable item. Therefore, the use of the type determination portion 122 is useful.

FIG. 2A is a flowchart illustrating an example of processing contents of a portion of a device control portion in FIG. 1. In FIG. 2A, the device control portion 10 determines whether a discarding process for a transport item is necessary (Step S201). Specifically, the device control portion 10 determines whether an irregular case, such as the occurrence of a device error, occurs. In the case in which the discarding process for the transport item is necessary, the device control portion 10 determines whether the common transport mechanism 114 is transporting a transport item (Step S202). Specifically, for example, in the case in which the common transport mechanism 114 transports a transport item with the transport item gripped using a gripper, the device control portion 10 determines the presence or absence of the transport item by detecting the opening and closing of the gripper. Note that in the case in which the discarding process for the transport item is unnecessary in Step S201, or in the case in which no transport item is present in Step S202, the device control portion 10 ends processes.

In the case in which a transport item is present in Step S202, the device control portion 10 causes the type determination portion 122 to determine the type of transport item (Step S203). In the case in which the type determination portion 122 identifies the type, the device control portion 10 performs a discarding process for each type (Steps S204 and S205). On the other hand, in the case in which the type is not identified by the type determination portion 122, the device control portion 10 halts the device operation, and notifies this to the device operation portion 11 (Steps S204 and S206). Note that here, the device control portion 10 halts the device operation in Step S206. However, the device control portion 10 may not halt the device operation and may end processes depending upon circumstances. The device control portion 10 may not perform the process in Step S202, and may determine the type of transport item in Step S203 regardless of the presence or absence of the transport item.

Here, the transport item is generally an expendable item (in this example, the reaction container 108 or the tip 109). However, the transport item is sometimes a special part due to device debugging. An example of a special part includes a fixture used for adjusting the position of the device. In the case in which the transport item is a special part and the type determination portion 122 fails to identify the special part, a process in Step S206 is performed. As a result, a situation in which the special part is discarded can be prevented.

FIG. 2B is a flowchart illustrating an example of detailed processing contents of a discarding process for each type in FIG. 2A. In FIG. 2B, in the case in which a transport item (i.e., an expendable item) is the tip 109 based on the determined result of the type determination portion 122, the device control portion 10 instructs the common transport mechanism 114 to transport the tip 109 to the buffer 113 (Steps S211 and S212). Subsequently, the device control portion 10 instructs the sample dispensing probe 105 to discard the tip 109 on the buffer 113 to the tip discarding port 115 (Step S213).

On the other hand, in the case in which a transport item (i.e., an expendable item) is the reaction container 108 based on the determined result of the type determination portion 122, the device control portion 10 instructs the common transport mechanism 114 to transport the reaction container 108 to the reaction portion 111 (Steps S211 and S214). Subsequently, the device control portion 10 instructs the reaction portion 111 to perform rotation operation (Step S215). After that, the device control portion 10 instructs the transport mechanism 117 to discard the reaction container 108 on the reaction portion 111 to the reaction container discarding port 112 (Step S216).

As described above, in discarding an expendable item being transported by the common transport mechanism 114, the device control portion 10 causes the common transport mechanism 114 to deliver the expendable item to a processing mechanism corresponding to a type of the expendable item, causes the processing mechanism not to perform the original processing that is a part of analysis processed, and causes the processing mechanism to perform the discarding process to the discarding port. For example, in the case in which an expendable item is the tip 109, the device control portion 10 causes the common transport mechanism 114 to deliver the expendable item to the sample dispensing probe 105 as the target processing mechanism is the sample dispensing probe 105, causes the sample dispensing probe 105 not to perform the original dispensing process, and causes the sample dispensing probe 105 to discard the expendable item to the tip discarding port 115. In the case in which an expendable item is the reaction container 108, the device control portion 10 causes the common transport mechanism 114 to deliver the expendable item to the reaction portion 111 as the target processing mechanisms are the reaction portion 111 and the transport mechanism 117, causes the reaction portion 111 and the transport mechanism 117 not to perform the original process, such as sample dispensing, magnetic separation, and detection, and causes the reaction portion 111 and the transport mechanism 117 to discard the expendable item to the reaction container discarding port 112.

Detail of the Type Determination Portion

FIG. 3 is a schematic view illustrating a configuration example of the type determination portion in FIG. 1. The type determination portion 122 in FIG. 3 has a plurality of sensors 302a and 302b that detect the presence or absence of a substance at different coordinates on a detection line 300 in a predetermined uniaxial direction. As examples of the plurality of sensors 302a and 302b, there are known reflective or transmissive photoelectric sensors, sensors using the reflection of ultrasonic waves, sensors that perform detection based on the presence or absence of a contact, an any other sensors.

As illustrated in FIG. 3, the common transport mechanism 114 in FIG. 1 is movable in the X-axis, the Y-axis, and the Z-axis directions with the transport item gripped by a gripper 301. The common transport mechanism 114 transports the transport item to the region of the type determination portion 122 on the XY-plane, places the transport item on the detection line 300 (here, on the Z-axis), and then moves the transport item by a specified amount 305 in the Z-axis direction. In this state, the type determination portion 122 determines the type of transport item based on the detected results of the plurality of sensors 302a and 302b.

In the examples in FIG. 3, the case is assumed in which the tip 109 that is the transport item (the expendable item) is longer than the reaction container 108 and two sensors 302a and 302b are used. In this case, the detected results of two sensors 302a and 302b are varied depending on the shape of the transport item (here, the length in the longitudinal direction). In the case in which the transport item is the tip 109, as illustrated in case A, both of two sensors 302a and 302b detect the presence of a substance. In the case in which the transport item is the reaction container 108, as illustrated in case B, one of two sensors 302a and 302b alone detects the presence of a substance. The type of transport item can be determined based on the difference in detected results.

With the use of such a type determination method, it is made possible to determine types by the number of sensors, or by the number of the sensors plus one. That is, when it is the premise that a transport item is present, both of the sensors 302a and 302b detect the absence of a substance in addition to the two types described above, and hence a shorter transport item (e.g. a fixture) can be distinguished. In the case in which it is not the premise that the transport item is present, a sensor is placed at a position at which the shortest transport item possibly transported, for example, can be detected, and hence the type determination portion 122 can also make determination including the presence or absence of the transport item.

Main Effects of First Embodiment

As described above, it is made possible to appropriately sort and discard expendable items using the automatic analysis device according to the first embodiment. In sorting and discarding, even in the case in which a plurality of types of expendable items is transported by the common mechanism like the common transport mechanism 114, appropriate sorting and discarding can be performed corresponding to a type of the expendable item to be transported. As illustrated in FIG. 2A, in the case in which the type determination portion 122 is operated when the type determination portion 122 is only necessary, it is made possible to maintain the throughput of the device.

Second Embodiment

Detail of Type Determination Portion (Exemplary Modification)

FIG. 4 is a schematic view illustrating a configuration example of the type determination portion in FIG. 1 in an automatic analysis device according to a second embodiment of the present invention. A type determination portion 122 in FIG. 4 has a sensor 402 that detects the presence or absence of a substance at predetermined coordinates on a detection line 300 in a predetermined uniaxial direction. That is, the type determination portion 122 includes a plurality of sensors in FIG. 3, but the type determination portion 122 includes one sensor 402 in FIG. 4. Similarly to the case in FIG. 3, a common transport mechanism 114 places a transport item on the detection line 300, and moves the transport item on the detection line 300. Unlike the case in FIG. 3, in this state, the type determination portion 122 in FIG. 4 determines the type of transport item based on the movement amount of the common transport mechanism 114 necessary to the sensor 402 that detects the presence of a substance.

Specifically, as illustrated in FIG. 4, a difference occurs in the movement amount of the common transport mechanism 114 until the sensor 402 detects the presence of a substance depending on the shape of the transport item (here, the length in the longitudinal direction). In the case in which the transport item is a tip 109, as illustrated in case A, a predetermined movement amount 405 is necessary until the sensor 402 detects the presence of a substance. On the other hand, in the case in which the transport item is a reaction container 108 shorter than the tip 109, a movement amount 407 greater than the movement amount 405 is necessary until the sensor 402 detects the presence of a substance. The type of transport item can be determined based on the difference in this movement amount.

Main Effects of Second Embodiment

As described above, with the use of the automatic analysis device according to the second embodiment, the effects similar to the case of the first embodiment are obtained. Compared with the method in FIG. 3, since one sensor is enough, costs are reduced, or the degree of freedom in placing the sensor 402 is improved, for example. Note that in distinguishing the difference in the movement amount, a range is determined on the movement amount taking into account of dimension differences due to individual differences of transport items and movement amount errors of the common transport mechanism 114, and it is fine that the transport item is in association with the range.

Note that here, the type of transport item is determined based on the difference in the movement amount until the sensor detects the presence of a substance. Conversely, the type of transport item may be determined based on the difference in the movement amount until the sensor detects the absence of a substance. That is, the common transport mechanism 114 may be moved until the absence of a substance is detected as the state in which the presence of a substance is detected is the initial state. Here, the common transport mechanism 114 is moved with the sensor fixed. However, the sensor may be moved by the common transport mechanism 114 fixed. However, in this case, since an increase in costs in association with the movement of the moving mechanism of the sensor, for example, possibly occurs, from this viewpoint, it is desirable to move the common transport mechanism 114.

Third Embodiment

Detail of Type Determination Portion (Exemplary Modification)

FIGS. 5A and 5B are schematic views illustrating a configuration example of a type determination portion in an automatic analysis device according to a third embodiment of the present invention. As illustrated in FIG. 5A, depending on the automatic analysis device, a common installation portion 501 is sometimes provided on transport paths for a plurality of types of transport items. On the common installation portion 501, a plurality of types of transport items is placed in common. In this case, for example, the common transport mechanism 114, for example, can determine the type of transport item with transport items placed on the common installation portion 501.

As illustrated in FIG. 5A, the common installation portion 501 is provided with at least one sensor 502. In this example, the sensor 502 is mounted such that detected results are varied corresponding to the lengths of transport items placed on the common installation portion 501. As a result, the type of transport item can be determined based on the detected result. Similarly to the case in FIG. 3, in the method, types can be determined by the number of sensors plus one type.

As illustrated in FIG. 5B, depending on the automatic analysis device, sensors 505a and 505b can also be provided on a common transport path for a plurality of types of transport items. In the example in FIG. 5B, a common transport mechanism 506 is provided. The common transport mechanism 506 transports a transport item by rotational motion on an XY-plane with the transport item mounted such that the transport item extends in the Z-axis direction. The sensor 505a and 505b are mounted such that the sensor 505a and 505b detect the presence or absence of an object at different coordinates on the Z-axis at certain XY coordinates. The type of transport item is determined based on the detected results of the sensors 505a and 505b when the transport item passes the XY coordinates by the rotational motion of the common transport mechanism 506.

Main Effects of Third Embodiment

As described above, with the use of the automatic analysis device according to the third embodiment, the effects similar to the case of the first embodiment are obtained. In the method in FIG. 3 or FIG. 4, the region of the type determination portion 122, and the common transport mechanism 114 has to be separately controlled such that the transport item is transported to the region. On the other hand, in the methods in FIG. 5A and FIG. 5B, it is made possible to determine the type in the process of normally transporting a transport item, and hence there is a useful case on the point of space efficiency or control efficiency. Note that here, an example of the common transport mechanism. 506 that performs rotational motion is shown. However, even in the case in which the common transport mechanism 114 illustrated in FIG. 1 is used, the type is sometimes determined with no association with the movement in the Z-axis direction using a method similar to FIG. 5B.

Fourth Embodiment

Detail of Device Control Portion (Exemplary Modification)

In the first to the third embodiments, the type is determined using the sensor. On the other hand, in the case in which the automatic analysis device illustrated in FIG. 1 sequentially records operation history on a memory 13 in the process of the operation, the type is sometimes determined using no sensor. Examples of the operation history mainly include time sequence information, the drive pulse result of a motor, and sensor status. However, the operation history is not limited to these, when the type of transport item can be determined.

FIG. 6 is a flowchart illustrating an example of processing contents of a portion of a device control portion in an automatic analysis device according to a fourth embodiment of the present invention. Compared with the flow illustrated in FIG. 2A, in the flow illustrated in FIG. 6, the process in Step S203 is replaced by a process in Step S603. In Step S603, a device control portion 10 operates as a type determination portion, and determines the type of transport item by making reference to the latest operation history recorded on the memory 13 when the discarding process for the transport item being transported by the common transport mechanism 114 is necessary (Step S201).

Main Effects of Fourth Embodiment

As described above, with the use of the automatic analysis device according to the fourth embodiment, the effects similar to the case of the first embodiment are obtained. The operation history is used, and hence the type can be determined including materials, states, and uses, not limited to the shape of the transport item. For example, it can be determined as well whether a transport item is already used for analysis is also possible. Thus, it is also possible to change the transport path (a discarding path), corresponding to whether the expendable item is used as the container for a biological sample based on the determined result.

Fifth Embodiment

Detail of Type Determination Portion (Exemplary Modification)

FIG. 7 is a schematic view illustrating a configuration example of a type determination portion in an automatic analysis device according to a fifth embodiment of the present invention. The type determination portion illustrated in FIG. 7 includes an imaging portion 702, an image analysis portion 703, and an operation control portion 704. The imaging portion 702 images a transport item being transported by a common transport mechanism 114. The transport item may be imaged when the transport item is moving, or the transport item may be imaged when the transport item is in a stationary state. The imaging portion 702 can be placed at any position on a normal transport path by the common transport mechanism. 114. As illustrated in the type determination portion 122 in FIG. 1, a dedicated region may be separately placed.

The image analysis portion 703 determines the type of transport item by analyzing an image imaged by the imaging portion 702. In the analysis process, the type of transport item may be determined from the shape of the transport item, for example, or the type may be determined from the color of a transport item. The operation control portion 704 controls imaging timing, for example, by the imaging portion 702 based on the instruction from a device control portion 10, for example.

In the example in FIG. 7, the imaging portion 702 images a tip 109 with the tip 109 gripped by a gripper 301 of the common transport mechanism 114. Here, depending on the automatic analysis device, the common transport mechanism 114 is sometimes appropriately involved in the transportation between processing mechanisms. In such a case, the state of the tip 109 gripped by the common transport mechanism 114, for example, possibly includes an unused state, a state in use, and a used state. In the tip 109 in FIG. 7, a biological sample (a specimen) 701 is dispensed in the state in use. When a method in FIG. 7 is used, the type of transport item can be determined including states, for example, not limited to the shape of the transport item. For example, it can be determined whether the tip 109 is being used. Thus, it is also possible to change the transport path (a discarding path) based on the determined result.

Main Effects of Fifth Embodiment

As described above, with the use of the automatic analysis device according to the fifth embodiment, the effects similar to the case of the first embodiment are obtained. The type can be determined including the state, for example, not limited to the shape of the transport item.

Sixth Embodiment

Schematic Configuration and Schematic Operation of Automatic Analysis Device (Exemplary Modification)

FIG. 8 is a schematic view illustrating a configuration example of a main portion of an automatic analysis device according to a sixth embodiment of the present invention. Compared with the configuration example in FIG. 1, the automatic analysis device illustrated in FIG. 8 is different in that a tip discarding port 115 and a reaction container discarding port 112 are provided in the traveling range of a common transport mechanism 114, not in the traveling range of the sample dispensing probe 105 or the transport mechanism 117. In this case, the common transport mechanism 114 can directly sort and discard expendable items being transported to the discarding port. Specifically, a device control portion 10 only has to control the common transport mechanism 114 such that any of a plurality of discarding ports is selected corresponding to the determined result of a type determination portion 122 and an expendable item being transported by the common transport mechanism 114 is discarded to the selected discarding port.

Main Effects of Sixth Embodiment

As described above, with the use of the automatic analysis device according to the sixth embodiment, the effects similar to the case of the first embodiment are obtained. However, in this case, unlike the configuration example in FIG. 1, the sample dispensing probe 105 or the transport mechanism 117 does not enable directly discarding expendable items, and the necessity arises that discarding is performed through the common transport mechanism 114 all the time. In this case, the throughput of the device might be reduced. It may be thought that the tip discarding port 115 or the reaction container discarding port 112 is provided in both of the traveling range of the sample dispensing probe 105 or the transport mechanism 117 and the traveling range of the common transport mechanism 114. However, in this case, the space efficiency of the device might be reduced. In the configuration example in FIG. 1, it may be thought that the traveling range of the common transport mechanism 114 is extended to the tip discarding port 115 or the reaction container discarding port 112. However, in this case, a cost increase in the device or a deterioration in the space efficiency of the device might be invited. Therefore, from such viewpoints, the configuration example in FIG. 1 is useful.

As described above, the invention made by the present inventor is described specifically based on the embodiments. However, the present invention is not limited to the embodiments, and can be modified variously within the scope not deviating from the gist of the present invention. For example, the foregoing embodiments are described in detail for easily understanding the present invention, and the present invention is not necessarily limited to ones including all the configurations described above. A part of the configuration of an embodiment can be replaced by the configuration of another embodiment, and the configuration of another embodiment can be added to the configuration of an embodiment. regarding a part of the configurations of the embodiments, another configuration can be added, removed, and replaced.

REFERENCE SIGNS LIST

10: device control portion, 11: device operation portion, 12: processor, 13: memory, 101: sample rack, 102: reagent container, 103: reagent disk, 104: container lid opening and closing mechanism, 105: sample dispensing probe, 106: reagent dispensing probe, 107: magnetic particle stirring mechanism, 108: reaction container, 109: sample dispensing tip, 110: storage box, 111: reaction portion, 112: reaction container discarding port, 113: buffer, 114: common transport mechanism, 115: tip discarding port, 116: magnetic separator, 117: transport mechanism, 118: impurity suction mechanism, 119: cleaning liquid discharge mechanism, 120: detection portion, 121: reagent discharge mechanism, 122: type determination portion, 123: container clamping device, 124: sample container, 300: detection line, 301: gripper, 302a, 302b: sensor, 402: sensor, 501 common installation portion, 502: sensor, 505a, 505b: sensor, 506: common transport mechanism, 701: biological sample, 702: imaging portion, 703: image analysis portion, 704: operation control portion

The invention claimed is:

1. An automatic analysis device, comprising:
a detector;
a storage unit storing a first expendable item and a second expendable item;
a common transport mechanism including a gripper and a plurality of rails on which the gripper moves along a first transportation path and a second transportation path, the common transport mechanism is configured to transport the first expendable item along the first transportation path and transport the second expendable item along the second transportation path;
a first expendable item discarding port disposed on the first transportation path;
a second expendable item discard port disposed on the second transportation path;
a rotatable reaction disk configured to hold the first expendable item disposed on the first transportation path;
a buffer configured to hold the second expendable item disposed on the second transportation path;
a first photoelectric sensor;
a second photoelectric sensor disposed below, in a vertical direction, the first photo electric sensor;
a controller coupled to the detector, the common transport mechanism, a first photoelectric sensor, and a second photoelectric sensor, the controller programmed to:
control the common transport mechanism to grip an expendable item, which is one of the first expendable item and the second expendable item, from the storage unit,
control the common transport mechanism to move the gripped expendable item to the first photoelectric sensor and the second photoelectric sensor,
receive detection results from the first photoelectric sensor and the second photoelectric sensor,
determine whether to transport the gripped expendable item along the first transportation path or the second transportation path based on whether the gripped expendable item is the first expendable item or the second expendable item based on the detection results,
control the common transport mechanism to transport the gripped expendable item according to the first transportation path and to the reaction disk upon determining to transport the gripped expendable item along the first transportation path, and
control the common transport mechanism to transport the gripped expendable item according to the second transportation path and to the buffer upon determining to transport the gripped expendable item along the second transportation path,
wherein the first expendable item is a reaction container, and
wherein the second expendable item is a sample dispensing tip.

2. The automatic analysis device according to claim 1, wherein the controller is programmed to:

control the common transport mechanism to transport the gripped expendable item to the first expendable item discarding port upon determining to transport the gripped expendable item along the first transportation path, and control the common transport mechanism to transport the gripped expendable item according to the second expendable item port upon determining to transport the gripped expendable item along the second transportation path.

3. The automatic analysis device according to claim 1, wherein the storage unit is a storage box.

* * * * *